Sept. 4, 1928.
C. H. BROWN
LAWN SWING
Filed June 25, 1925   2 Sheets-Sheet 1
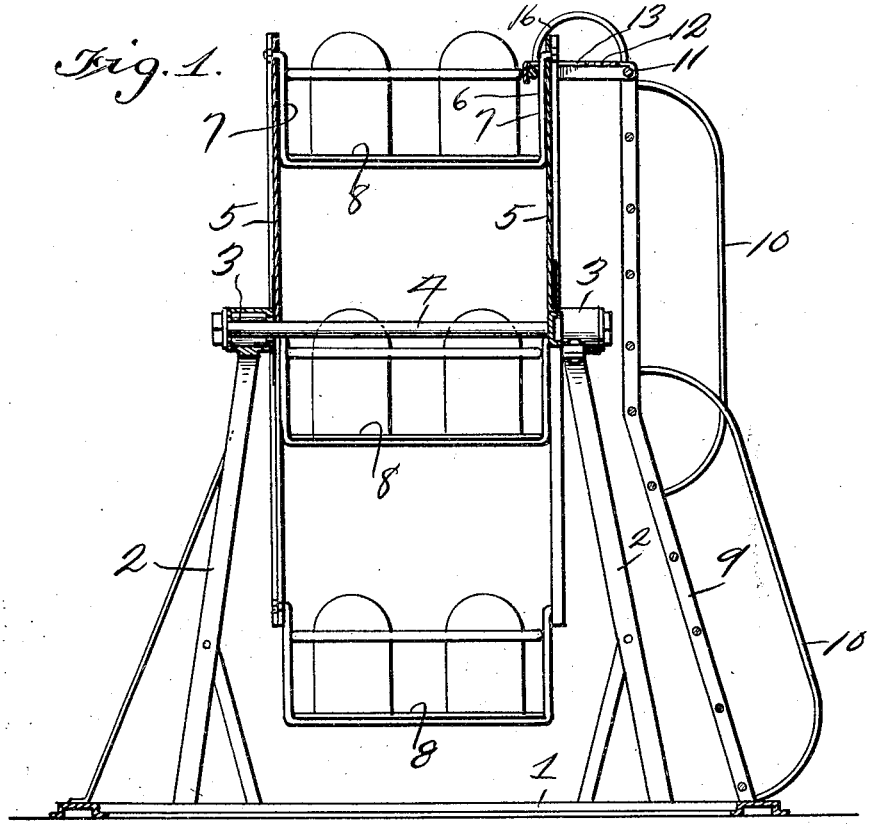
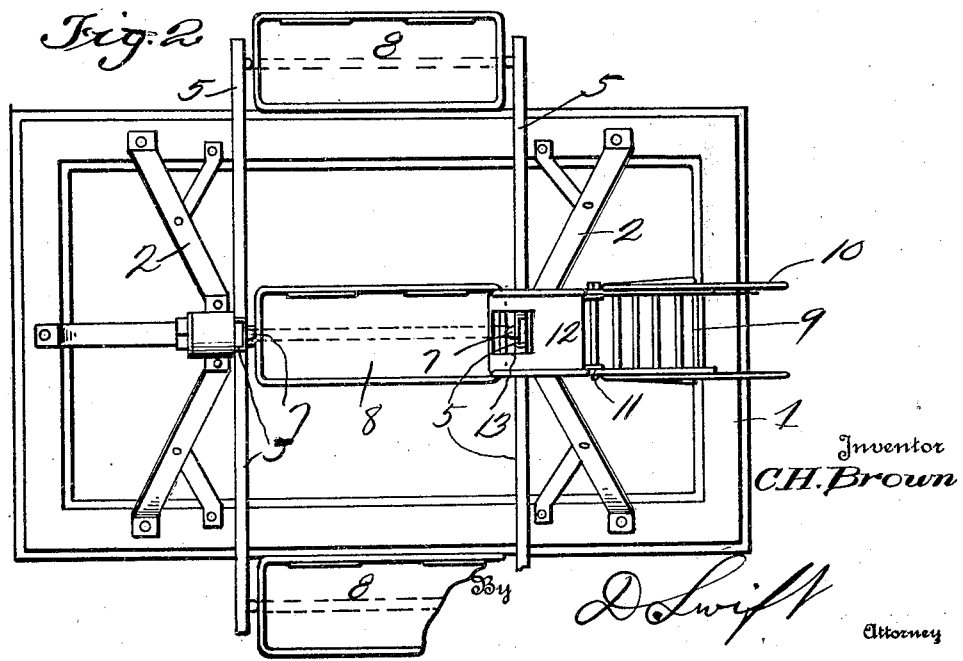

Sept. 4, 1928.

C. H. BROWN

LAWN SWING

Filed June 25, 1925

Inventor
C. H. Brown
By D. Swift
Attorney

Patented Sept. 4, 1928.

1,683,237

UNITED STATES PATENT OFFICE.

CHESTER H. BROWN, OF KOPPERL, TEXAS.

LAWN SWING.

Application filed June 25, 1925. Serial No. 39,484.

The invention relates to lawn swings of the Ferris wheel type, and has for its object to provide a device of this character comprising spaced supports carried by a base and between which spaced supports is rotatably mounted a reel having radially disposed arms between which are pivotally mounted seats, in which persons may be seated during the rotation of the device, and may rotate the device by placing the feet upon the ground as the seats reach positions adjacent the ground.

A further object is to provide a ladder at one side of the device, to the upper end of which is hingedly connected a platform having an opening therethrough, and which platform, when placed in a horizontal position receives in the opening thereof the end of one of the radially disposed wheel arms and a downwardly extending horizontally disposed flange of the platform engages over the side bar of the adjacent seat for steadying and holding said seat against rotation when a person is getting into the seat from a platform. Also to provide rails at opposite sides of the platform, adapted to be grasped by a person passing over the platform.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the device, parts being broken away to better show the structure.

Figure 2 is a top plan view.

Figure 3:
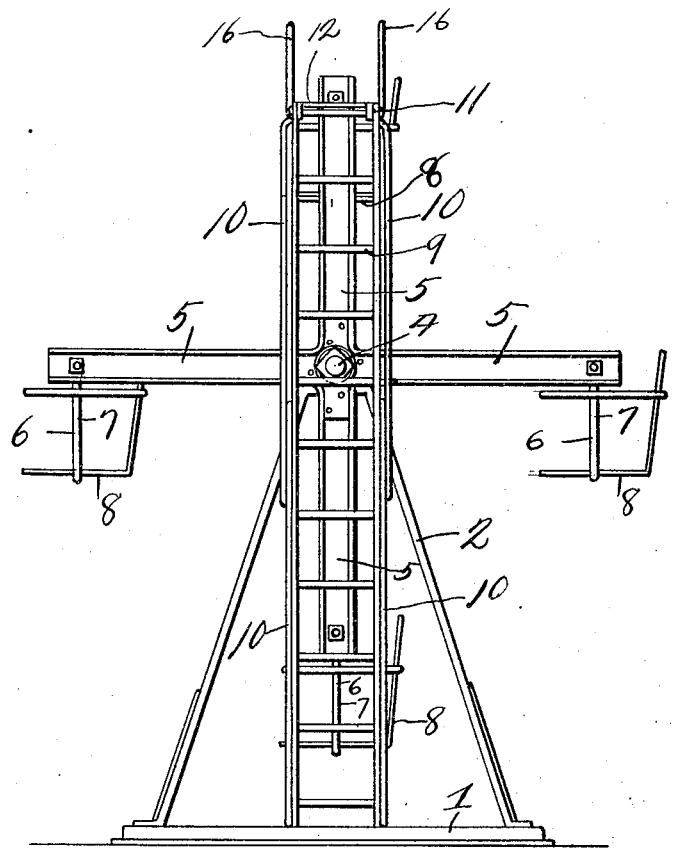
Figure 3 is a side elevation of the device.
Figure 4:
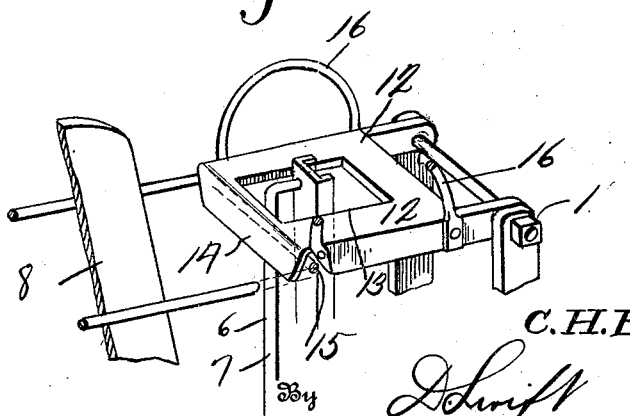
Figure 4 is a detail perspective view of a portion of the rotatable reel and the hinged platform showing the platform holding one of the seats and the reel.

Referring to the drawing the numeral 1 designates the base of the device, and 2 spaced upwardly extending standards in bearings 3 of which is rotatably mounted the horizontally disposed reel shaft 4. The reel shaft 4 is provided with a plurality of radially disposed arms 5, between the outer ends of which are pivotally mounted U-shaped seat frames 6, the arms 7 of which register with the radially disposed arms 5 when in vertical position and at top elevation as clearly shown in Figure 1. In use persons, one or two as desired, are seated in the seats 8 of the U-shaped brackets 6, and when the seats reach points adjacent the ground, the occupants of the seats place their feet in engagement with the ground for imparting rotation to the reel as a whole.

Extending upwardly at one side of the device is a ladder 9 having hand rails 10 and up which ladder persons climb for entering the seats 8 when they are at their highest elevation. Hingedly connected at 11 to the upper end of the ladder 9 is a platform 12, which platform is provided with a centrally disposed opening 13 which receives the adjacent arm 5 of the reel, and the upper end of the adjacent arm 7 of the U-shaped frame 6 of the adjacent seat for holding the reel against rotation and the seat against pivotal action. Platform 12 is provided with a downwardly extending flange 14 which hooks over the horizontal bar 15 of the seat frame, and in connection with the platform holds the seat against pivotal movement, and rigidly, when a person is getting into the seat. The platform 12 is provided with oppositely disposed rails 16 adapted to be grasped by a person passing over the same to a seat and also forming means adapted to be grasped by a person for moving the platform to operative or inoperative position. After a person is seated the platform is hingedly moved outwardly for releasing the reel.

From the above it will be seen that a lawn swing of a Ferris wheel type is provided which is simple in construction, the parts reduced to a minimum, and one which may be built to receive any number of seats desired, and to be placed on a lawn for use by children or adults. It will also be seen by providing the pivoted or hinged platform 12, said platform not only forms means over which a person may pass from the ladder to the seat, but also means for positively holding the reel against rotation and the seats against pivotal action when persons are entering or leaving the seats, thereby obviating danger of injury which is a common difficulty in devices of this general character when persons are entering or leaving the seats thereof.

The invention having been set forth what is claimed as new and useful is:—

The combination with a Ferris wheel having seat frames pivotally connected to arms of the wheel, a ladder adjacent one side of said wheel, of a platform hingedly connected to the ladder, walls carried by said platform and formed by an opening therein, said walls of the platform formed by the opening engaging one of the arms of the wheel and the pivoted seat frame carried thereby to the inside of the arm and at opposite sides of the pivoted seat frame pivotal point.

In testimony whereof I have signed my name to this specification.

CHESTER H. BROWN.